H. B. LOWDEN.
PROCESS FOR DRYING MATERIALS.
APPLICATION FILED OCT. 22, 1917.

1,339,771.

Patented May 11, 1920.
5 SHEETS—SHEET 1.

Inventor:
Hugh B. Lowden,
by Spear, Middleton, Donaldson & Spear
Atty's.

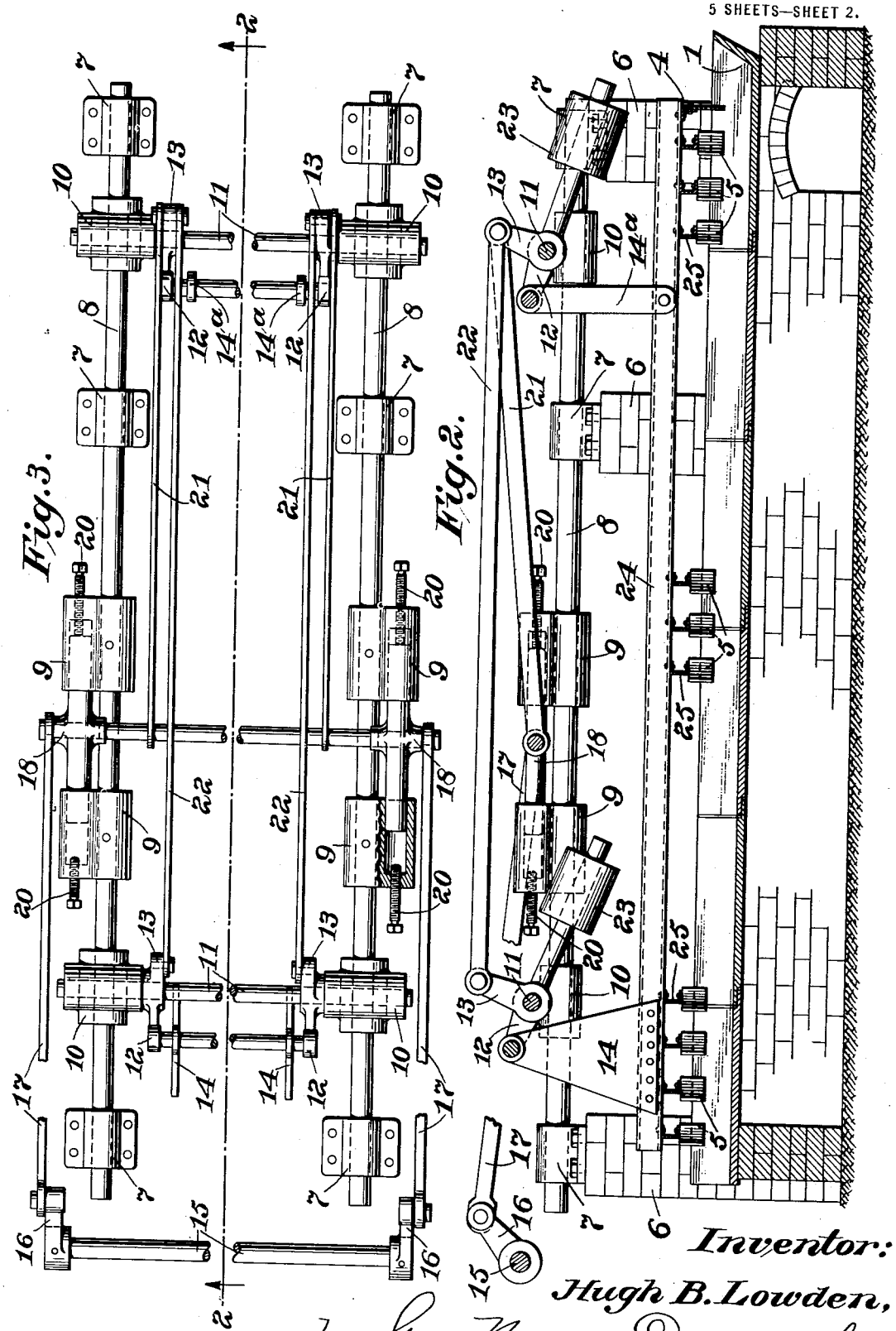

H. B. LOWDEN.
PROCESS FOR DRYING MATERIALS.
APPLICATION FILED OCT. 22, 1917.
1,339,771.
Patented May 11, 1920.
5 SHEETS—SHEET 3.
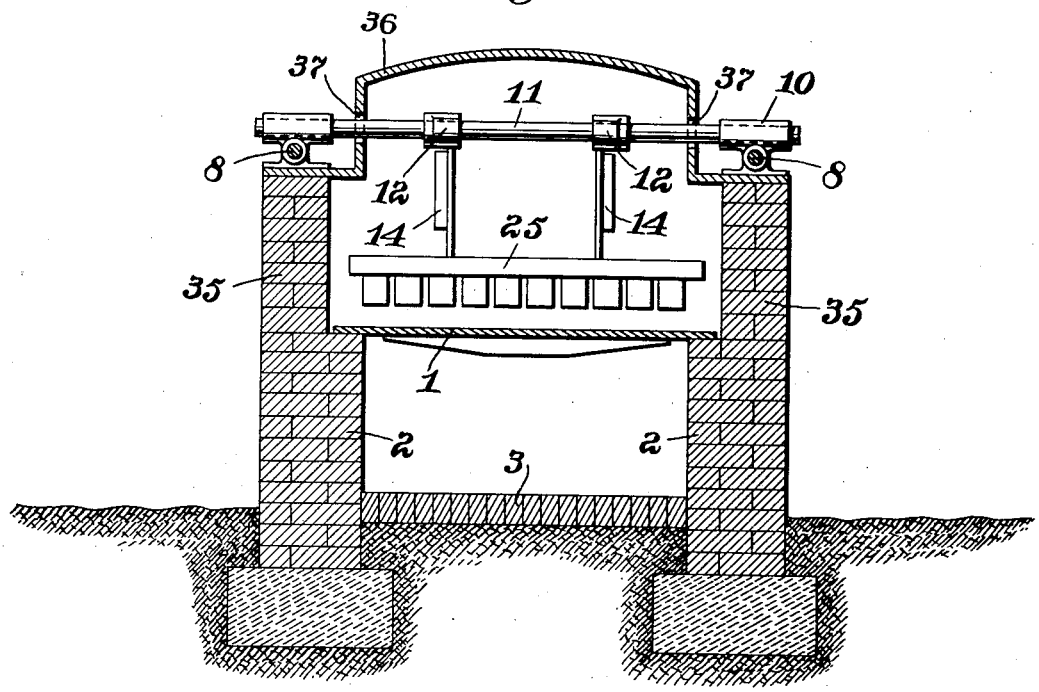
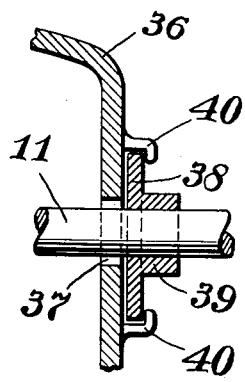
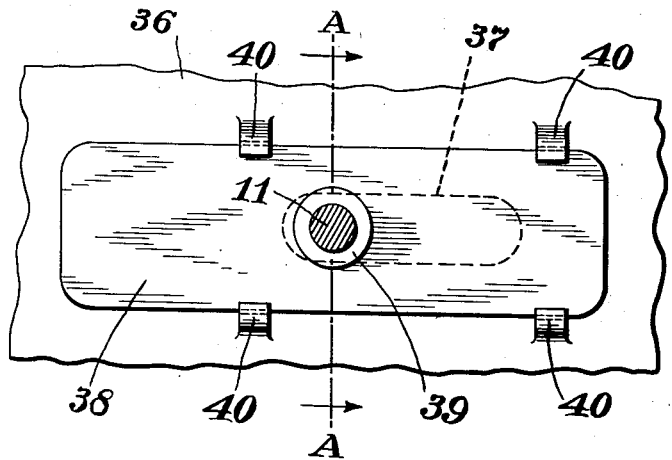
Inventor:
Hugh B. Lowden,
by Spear, Middleton, Donaldson & Spear
Att'ys.

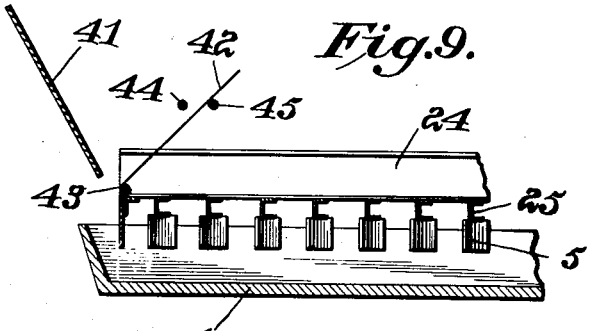
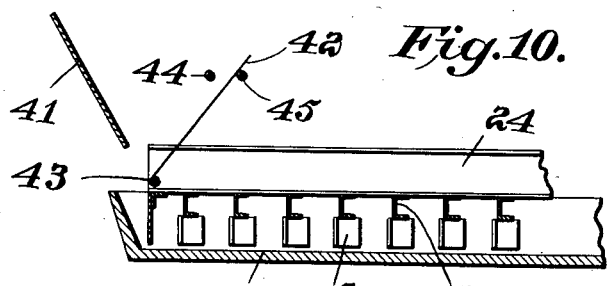
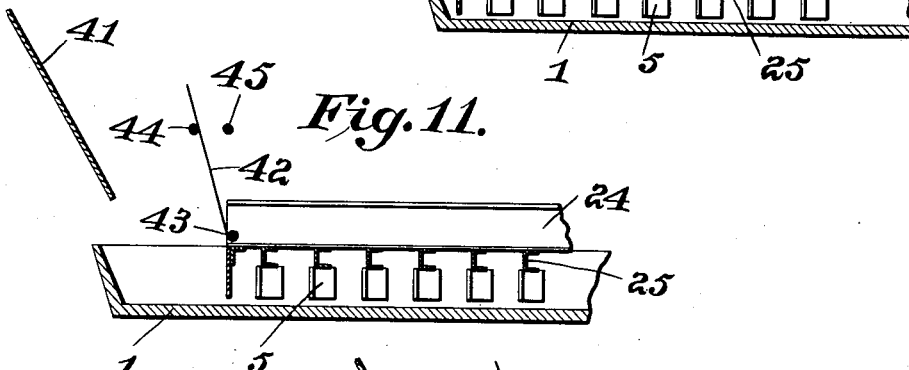
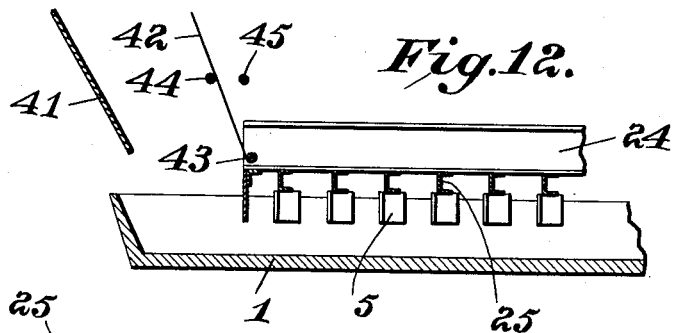
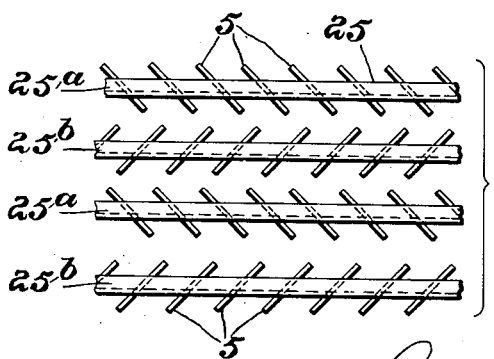

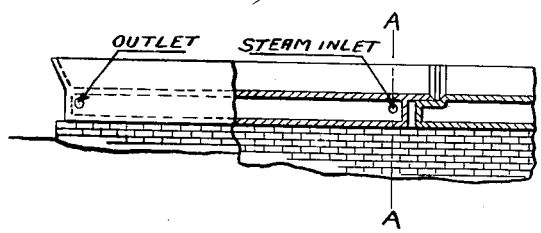
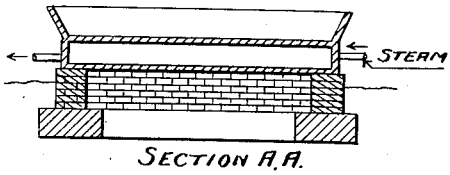
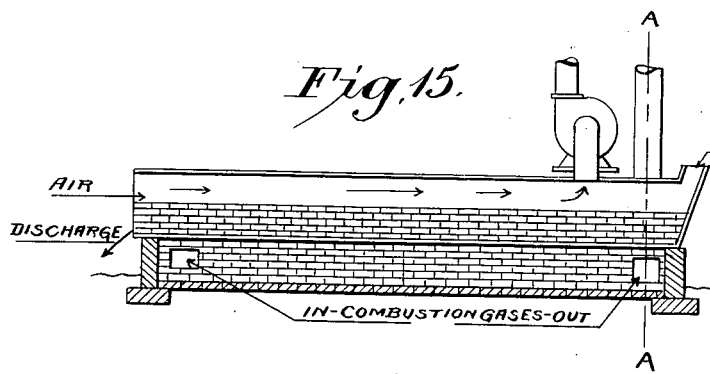
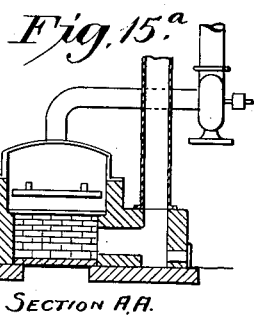
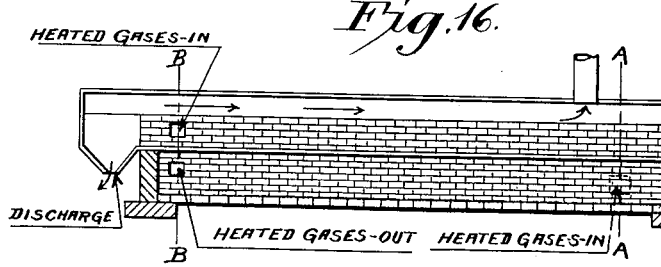
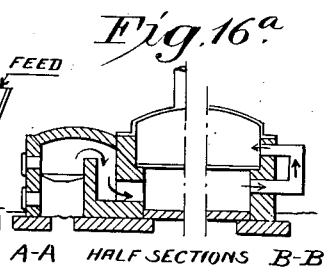
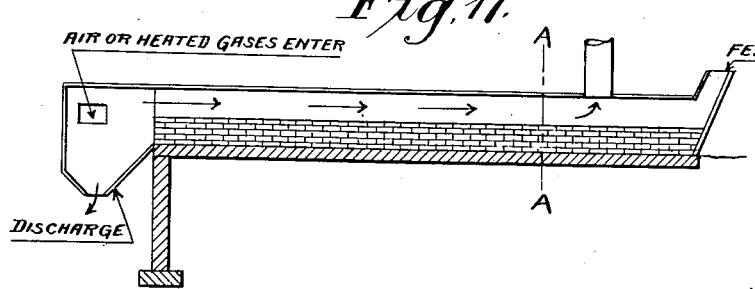
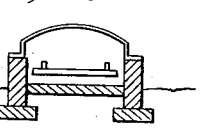

UNITED STATES PATENT OFFICE.

HUGH B. LOWDEN, OF DENVER, COLORADO.

PROCESS FOR DRYING MATERIALS.

1,339,771.  Specification of Letters Patent.  Patented May 11, 1920.

Application filed October 22, 1917. Serial No. 197,905.

*To all whom it may concern:*

Be it known that I, HUGH B. LOWDEN, a citizen of the United States, and resident of Denver, Colo., have invented certain new and useful Improvements in Processes for Drying Materials, of which the following is a specification.

My invention relates to a method of drying or partially eliminating moisture from materials, and is designed to afford simple, effective and economical means for drying materials, particularly such as could not be handled satisfactorily in driers of preëxisting types, or if so handled, would suffer serious dust losses or injury to the quality of the product.

As an example of the class of material to which my present invention is especially adapted, I mention flotation concentrates, obtained in the treatment of ores. This product is customarily dewatered on continuous revolving drum vacuum filters, but after such dewatering still retains sufficient moisture to render it plastic, which occasions serious difficulty in subsequent treatment, such, for example as the impossibility of so mixing it with other, usually dry, ingredients as to properly incorporate it in a suitable charge for sintering. Where the flotation concentrates from their nature, are preferably roasted directly, as in multiple hearth roasting furnaces, their high moisture content reduces the capacity of the furnaces, and their cohesive and adhesive qualities cause them to interfere with the normal operation of the rabbling means, as also to ball up and resist proper exposure to the air.

The difficulties above alluded to are new ones, in that they were practically non-existent prior to the advent of the flotation process. Novel means were required to meet them and the invention herein described discloses a thoroughly satisfactory method and apparatus for overcoming them. However, my invention is equally well adapted to other products which have heretofore been difficult to dry on a large scale.

I dry the product mentioned, or other material, by feeding it to a heated surface and operating upon it in such a manner that there is no loss from dusting, no interference with the operation by clogging, no possibility of undried material being discharged, and practically no loss of efficiency through heat insulation by part of the material operated upon remaining immediately upon the heated surface and not being removed when dry. Furthermore, by thus drying upon a heated surface there is no contamination of the product by the smoke and gases of combustion, which is objectionable with certain classes of material.

One or more of the above defects is present in all preëxisting methods of drying. Direct heat driers carry off a prohibitive amount of dust in operation, and also permit the contamination of the material by the products of combustion. All revolving cylinder driers are subject to operating difficulties due to plastic material adhering to their interiors and to balling up of the cohesive material. Drying upon hearths rabbled by chain dragged rabbles is attended by the discharge of undried material which has adhered to the rabbles; and, if the clogging is extensive, by the sweeping of all or a large part of the material undried from the hearth. Drying upon hearths over which the material is advanced by so-called grasshopper conveyer mechanisms is of very low efficiency, due to material remaining upon the hearth and not being removed owing to the arcuate paths described by such mechanisms, and to the fact that such mechanisms do not break up masses of adhesive material, but tend to ball it up and push or roll the masses over the hearth.

The first of the latter two defects prevents efficient heat transference from the hearth to the material, and the second impedes the escape of moisture from the material into the atmosphere.

The methods of these machines differ essentially from my method in that they do not include the distinct subdividing of cohesive masses of material, whereas my method effects the repeated cutting of such masses, thereby exposing fresh surfaces and preventing the material from baking in hard lumps from which moisture is very slowly eliminated. As a result of this, satisfactory operation of all such methods is limited to granular materials having little or no cohesive and adhesive properties. This is commonly recognized, and such driers, owing largely to the absence of definite breaking-up action in their methods of operation are generally regarded unsuitable for drying floatation concentrates and, so far as I am aware, flotation concentrates are not dried by any of them in practice.

For efficiently drying the class of materials referred to, I have found it necessary to move the material over the hearth by repeated short strokes, and to also cleave the cohesive masses with such frequency that fresh surfaces are exposed for the escape of moisture and the material is not permitted to dry or bake in lumps.

To carry out my method I use a hearth surmounting a flue through which I pass the heated gases of combustion as from a firebox, or waste heated gases from some other operation, if available. My hearth may consist of a jacketed pan through which exhaust or live steam is passed as shown in Figs. 14 and 14a, or of any surface heated by other means. Under certain conditions a muffle might be preferable to a hearth, and such a muffle might be heated from without, air, or heated air or gases being forced or drawn through the interior of the muffle or not, or the only heat applied might be through the medium of heated air or gases passed through the muffle.

Furthermore, the drying might be accomplished, either upon a hearth or within a muffle, by mere exposure to the atmosphere, without the application of heat, when, for example, the material would be injured by an elevated temperature.

In describing my method of operating upon the material, I shall confine myself to a hearth heated from beneath, as the operation in a muffle will be readily understood therefrom.

I feed the material upon the hearth at one end, and operate upon it by a large number of plows, or rabbles, which conveniently act simultaneously. I move this series of rabbles, which collectively I designate a rake, by mechanical means, forward as closely to the hearth as practicable. I then raise them out of contact with the material on the hearth in a substantially vertical direction so that there is no tendency of the rabbles to drag over or compress the material. I then move them backward out of contact with the material on the hearth, and next lower them into the material so that they cut into the masses left by the preceding forward stroke. This is one cycle of the operation which proceeds continuously as long as power is applied, and it will be seen that there is no possibility of undried material being discharged, as any masses which adhere to the rabbles will fall back upon the hearth at or near the point from which they are lifted.

I append hereto drawings illustrating my preferred forms of apparatus adapted to carry out my method, the various parts being designated by reference characters, the same reference character indicating the same or corresponding part in the various figures.

In the drawing Figure 1 represents a transverse section through the hearth, flue, rake and operating mechanism.

Fig. 2 is a longitudinal section on the line 2—2 of Figs. 1 and 3.

Fig. 3 is a plan of the operating mechanism.

Fig. 6 is a transverse sectional elevation of my rabbling means embodied with a muffle.

Figs. 7 and 8 are details of the last named.

Figs. 9 to 12 inclusive, are details of an attachment to the rake.

Fig. 13 shows my preferred arrangement of the rabbles.

Fig. 14 is a partial sectional elevation and Fig. 14a a transverse section on line a—a of Fig. 14 showing a steam jacketed hearth.

Figs. 15 and 15a are similar views of such a muffler heated from beneath.

Figs. 16 and 16a are views showing a modified arrangement of the muffle of Fig. 15.

Figs. 17 and 17a are similar views of a further modification.

Figure 1:
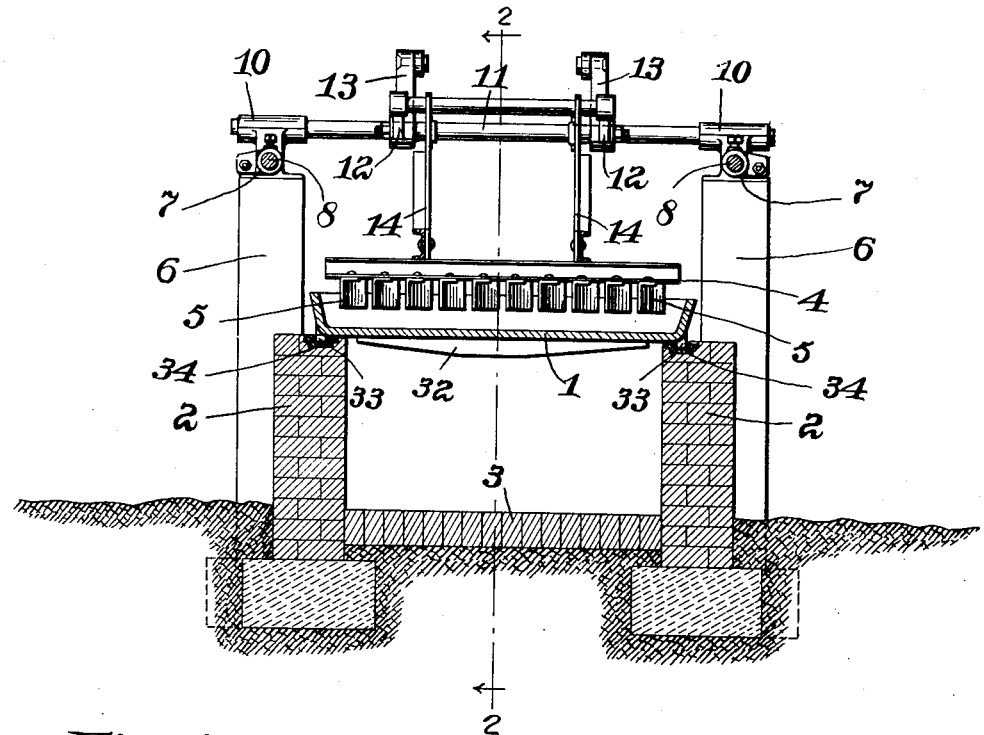

In Fig. 1, the hearth, composed of cast iron plates, is shown at 1. These rest upon longitudinal side walls 2, with which they form a flue, through which heated gases as from a firebox are passed for the purpose of heating the hearth. The bottom of this flue may be paved, as indicated at 3. The rake, 4, is studded with plows or rabbles 5, and is adapted to operate in connection with the hearth. Piers 6 are shown supporting the rake operating mechanism.

In Fig. 2 the hearth is shown at 1, the rake at 4, with its rabbles 5. At 7 are bearings fixed to the tops of the piers 6 of Fig. 1. 8 is a bar adapted to slide lengthwise in the bearings 7. 9 are blocks fixed upon the bar 8. 10 are bearings fixed upon the bar 8, so as to move with it and receive the rock shafts 11. The rock shafts 11 carry arms 12 and 13, extending substantially at right angles to each other and forming in effect a bell crank. The arms 12 carry the rake at their free ends by the uprights 14 and 14a, and by the vertical oscillation of their free ends effect the raising and lowering of the rake.

At 15 is shown a shaft, the rotation of which operates the rake mechanism, through the crank 16, which communicates a reciprocating motion to the connecting rod 17. The rod 17 is connected at its other end to a crosshead 18, which is adapted to reciprocate in suitable guides in the blocks 9. The reciprocation of the cross head with respect to the blocks 9 is limited by the set screws 20.

The extent to which the crosshead can reciprocate in the blocks 9 is less than the stroke of the connecting rod 17, and after it has been moved to the limit fixed by the set screw 20 further motion of the connecting rod will cause the bar 8 to slide in its bearings 7. This effects the horizontal components of my rectangular motion.

The vertical components of my motion are effected by the connection of the crosshead with the arm 13, by the rod 21, which converts the reciprocating motion of the crosshead into an oscillating motion of the rock shaft.

The operation of the mechanism is therefore as follows:

Power is applied to rotate the shaft 15, which through the crank, 16, causes the bar 17 to reciprocate. The first effect of this reciprocation, assuming it to be toward the left (in Fig. 2) is to draw the upper end of the arm 13 toward the left, thus depressing the arm 12 and forcing the rake down into the material on the hearth. This movement is interrupted by the set screw stop 20 after which the stroke moves the bar 8 with all its attached parts, including the rake, toward the left until the crank 16 reaches the dead center.

After passing the dead center, the connecting rod 17 will move toward the right, first sliding the crosshead in its guides and raising the rake until the crosshead engages the set screw, then pushing the rake toward the right in its upper plane of travel and out of contact with the material on the hearth. This completes one revolution of the shaft 15 or one cycle.

As above indicated, the set screws 20 control the extent of the vertical component of the rectangular path described by the rake. In practice, I allow ample lift, and use the excess to regulate the horizontal component. The set screw 20 at the left, in Fig. 2, should be so adjusted that the rake will operate as closely as possible to the hearth on the forward stroke. The set screw shown at the right controls the height to which the rake is lifted, and an excess over what is really necessary is without effect on the operation. Therefore, this set screw is used to fix the length of the forward stroke, so that the rabbles on rising leave the masses of material at the proper points for the rabbles on again descending to cut into and effectively subdivide them.

It will be understood that although I have described my mechanism and its operation by reference to a single set of the essential elements, I in fact make use of more than one set.

Thus in Figs. 2 and 3 the rake has four points of support, corresponding to which there are four bell cranks on two rock shafts. The bell cranks obviously should oscillate in unison, and this may be conveniently provided for by connecting the arms 13 by the rods 22.

In practice, I counterbalance the rake by counterweights indicated at 23.

I preferably construct my rake of longitudinal members 24 to which transverse bars 25 are fixed at intervals. The transverse bars bear the rabbles 5 which I make of sheet metal.

In the mechanism just described, the vertical components of the rectangular movement are not strictly vertical, that is straight line movements, but through an arc of which the rock shaft is the center. However, the bell crank principle is exceedingly simple and convenient and I have found in practice that the slight departure from a true straight line is wholly immaterial.

Figure 4:
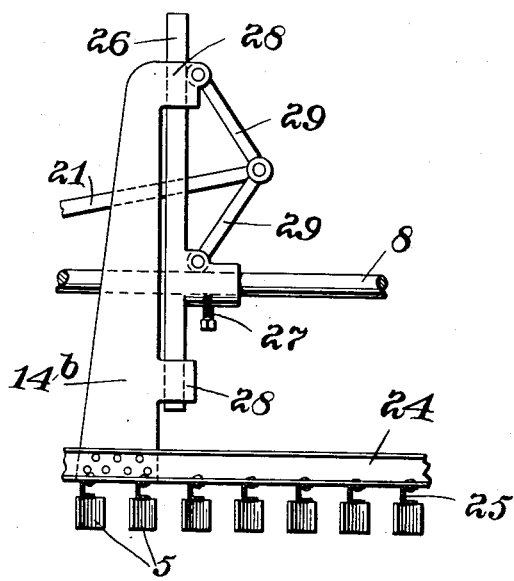
Fig. 4 shows another mechanism for securing a suitable rectilinear motion in four directions.

I show, in Fig. 4, means for obtaining a truly straight line rectangular motion, this figure including only the parts which would take the place of the bell crank of Fig. 2.

In Fig. 4, 8 is the reciprocating bar, 24 is the longitudinal member of the rake, and 14$^b$ is the rake upright. A vertical guide bar 26 is attached to the reciprocating bar as by the set screw 27, and the rake upright is furnished with parts 28 encircling the guide bar which permit it to move only vertically on the guide bar. 29 is a toggle, connecting the rake upright with the bar and 21 is the connecting rod attached at the end shown to the knee of the toggle, and at the other end to the crosshead. A pull on the rod 21 will raise the rake and a push will lower it.

Figure 5:
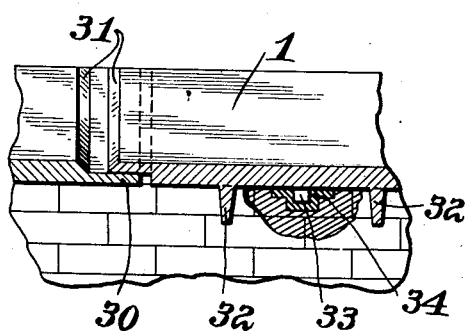
Fig. 5 is a detail of my preferred hearth construction.

Fig. 5 is a partial longitudinal section through the hearth, showing how I form the pans which compose it. Expansion and contraction in a long hearth is considerable, and bolting the sections together would be unsatisfactory on that account. I make the individual sections of the hearth to lap, one over the other, as at 30, and I bevel the edges as at 31, so that any material which may have collected in the space between them will, upon further expansion due to higher heating, be forced upward and out of the joint and prevent one section from tending to displace the adjoining one. 32 are strengthening ribs, and 33 is a lug in the center of each side of the hearth pan. This lug 33, rests in a small anchor plate 34 (also shown in Fig. 1) which it fits snugly in a direction longitudinally of the hearth, but sufficiently loosely in a transverse direction to permit expansion to be accommodated for. Thus each individual hearth plate can expand or contract transversely by the lug sliding in the anchor plate, and longitudinally by the edge of one plate sliding upon the other, the lug 33 holding the center of each plate and consequently the entire length of the hearth fixed.

Fig. 6 shows apparatus for conducting the operation in a muffle. In this, continuous walls 35 replace the piers (6 in Fig. 1), and a hood 36 forms with the walls a muffle. As conditions may dictate, the muffle may be heated from beneath as shown in Figs. 15 and 15ª and the space within the muffle used for the removal of the moisture evaporated, or the heated gases after passing beneath the bottom of the muffle may be returned through it, as shown in Figs. 16 and 16ª, or the flue beneath the muffle might be dispensed with and heated air or gas drawn or forced through the muffle, as shown in Figs. 17 and 17ª. In these views the rabbles are omitted for convenience of illustration.

The hood of the muffle, I provide with slots 37, through which the rock shafts extend. The special features of these slots are shown in Figs. 7 and 8. Fig. 7 is a side elevation of a small part of the hood, and Fig. 8 is a transverse section on the line A—A of Fig. 7.

To prevent excessive leakage through the slot I provide a cover plate 38 carried by the rock shaft which has a working fit in the boss 39. The plate is retained by the lugs 40, but is free to slide forward and backward with the rock shaft.

The material to be dried may be fed to the hearth automatically in the form of the discharge from a revolving drum filter, in which case it may conveniently fall to it over the apron plate 41 of Figs. 9, 10, 11 and 12. Material in a certain physical condition will have a tendency to fall and remain upon the rake bars at this point, and I provide a deflector 42 attached to the rake by the hinge 43. This deflector is free to move within limits fixed by the length of stroke of the rake and the position of the stationary pins 44 and 45.

In Fig. 9 the rake is shown at the completion of the backward stroke, before it has been lowered. In this position the deflector rests upon the pin 45 and will catch any material which in its absence would fall upon the rake. Fig. 10 shows the rake after the lowering movement, the deflector still resting upon the same pin and shielding the rake.

As the rake moves forward, that is toward the right, the lower end of the deflector will be carried with it, and the upper end will ride upon pin 45 until the center of gravity of the deflector with its load passes to the right of pin 45, whereupon it will fall upon pin 44 and the jar it thereby receives will shake off adhering material. This position of the parts is represented in Fig. 11.

Fig. 12 shows the rake after completion of the raising movement and before the backward stroke has commenced. The deflector is still resting upon the pin 44 and will continue to do so until the hinge passes to the left of it, when it will fall upon pin 45, and at completion of the stroke be again in the position shown in Fig. 9.

In Fig. 13 I show a detail of my preferred rake construction. The figure is a plan of a small section of my rake, and shows the manner in which I dispose the rabbles 5 on the transverse rabble bars 25 to positively effect the subdividing or cleaving of the material being dried. Adjacent bars carry alternately right-hand and left-hand rabbles; thus, if those on the bars 25ª are designated right-hand, those on 25ᵇ will be left-hand.

The rabbles, moving forward, will each push along what material is in front of them, and when they are raised, will leave it in small masses upon the hearth. Now I so proportion the distance between the rabble bars and the length of the stroke of the rake, that upon again entering the material they do not enter the spaces left by the previous stroke, but enter these masses and cleave them; the repetition of this action soon accomplishing a thorough subdivision of the material.

If the conveying movement of the rake is assumed to be upward in the plane of the paper, in Fig. 13, and the rake is assumed to have completed the conveying stroke, it will next rise, and after completing the return stroke descend into the material, the rabbles on 25ª entering the piles of material left by the rabbles on 25ᵇ, thereby cutting them open and exposing fresh surfaces.

In practice, more or less material, if adhesive, clings to the rabbles; but this does not interfere with the satisfactory operation of the machine, because owing to the action of the rake being a reciprocating one, the material so attached to the rabbles will eventually fall back upon the hearth in substantially the same place it was lifted from, and cannot be discharged undried.

When operating upon adhesive material, there is little or no actual plowing action at the feed end of the hearth, due to the obliquity of the rabbles, nor is this essential at that stage of the drying, the chopping up of the masses being there most important. However, after the material has lost a portion of its original moisture, and has become thoroughly subdivided, the rabbles do then push it sidewise as well as forward and this action effectively exposes all parts of it to the heat of the hearth and to the atmosphere. I attach the rabbles 5 adjustably, so that their angles with the rabble bars can be changed, and the rake caused to convey the material rapidly or slowly, as may be desired.

The rake, operating immediately above the hearth, is subjected to a higher temperature than the reciprocating bars 8 and to permit the unequal expansion of these parts, I make a rigid attachment to but one end of the rake, that being shown at 14. Other supports I connect by links 14ª connected to both rake and arm 12. This adapts such link 14ª to lift and lower and causes the reciprocation to be communicated to the rake by the rigid upright 14. This provision prevents unequal expansion from setting up strains and promotes smoothness of operation. It also eliminates vibration which a long rake would be subjected to if rigidly connected at all points of support.

The operation of my method of drying is carried out by use of the herein described apparatus as follows:

Heat is continuously communicated to the hearth, and the material delivered upon it, preferably also continuously, as by allowing it to fall directly from the discharge of a drum filter. The feed end, in the drawings forming part hereof, is the end remote from the driving mechanism.

Assuming the rake to have completed the backward or return stroke, it descends into the material, the rabbles cutting the lumps or ridges of material left by the rake upon rising for the return stroke. Forward movement of the rake now takes place closely to the surface of the hearth, each rabble pushing forward and sidewise the material in its path. The rake next rises and then returns to the backward limit of its stroke, moving in a plane above and out of contact with the material on the hearth, this completing one cycle.

The material being thus moved through but a small portion of the length of the hearth by one stroke of the rake, requires considerable time in passing over its entire length and is subjected to the cleaving and plowing action of the rabbles repeated many times.

The time required for drying differs with the nature of the material and amount of moisture in it, as well as with the extent to which the moisture must be eliminated. The time it will remain on the hearth can be regulated by the speed of revolution of the shaft 15 and by the angle at which the rabbles are set. Thus the speed and the rate of feed being unchanged, a thin bed of material moving rapidly or a deep bed moving slowly may be maintained, depending upon whether the rabbles are slightly or steeply inclined to the longitudinal axis of the hearth.

What I claim is:

1. A method of mechanically drying materials consisting in delivering the material upon a hearth at one end, applying heat to the hearth, and advancing the material over the hearth toward the other end by repeatedly cleaving it in a substantially vertical direction and pushing it through a small part of the length of the hearth.

2. A method of mechanically drying materials consisting in delivering the material upon a hearth at one end, applying heat to the hearth, and advancing the material over the hearth toward other end by repeatedly first cleaving it simultaneously at a plurality of points by a substantially straight line movement and then simultaneously pushing portions of it toward said other end through a small part of the length of the hearth.

3. The herein described method of drying materials which consists in feeding the material in a layer or stratum to a drying surface, cleaving it at a plurality of isolated points in a substantially vertical direction, pushing the cleaved portions lengthwise of the drying surface, and again cleaving the material at points intermediate of the previous cleavings.

In testimony whereof I affix my signature.

HUGH B. LOWDEN.